United States Patent
Napolitano et al.

(10) Patent No.: US 8,908,475 B2
(45) Date of Patent: Dec. 9, 2014

(54) ACOUSTIC POSITIONING SYSTEM AND METHOD

(75) Inventors: Fabien Napolitano, Mareil-Marly (FR); Sebastien Pennec, Landerneau (FR); Didier Charlot, Le Relecq-Kurhuon (FR)

(73) Assignee: IXBLUE, Marly-le-Roi (FR)

( * ) Notice: Subject to any disclaimer, the term of this patent is extended or adjusted under 35 U.S.C. 154(b) by 0 days.

(21) Appl. No.: 14/342,940

(22) PCT Filed: Sep. 6, 2012

(86) PCT No.: PCT/FR2012/051997
§ 371 (c)(1),
(2), (4) Date: Mar. 5, 2014

(87) PCT Pub. No.: WO2013/034859
PCT Pub. Date: Mar. 14, 2013

(65) Prior Publication Data
US 2014/0204715 A1     Jul. 24, 2014

(30) Foreign Application Priority Data
Sep. 6, 2011    (FR) ..................... 11 57884

(51) Int. Cl.
*G01S 1/80*     (2006.01)
*G01S 1/76*     (2006.01)
*G01S 5/22*     (2006.01)

(52) U.S. Cl.
CPC ... *G01S 1/80* (2013.01); *G01S 5/22* (2013.01); *G01S 1/807* (2013.01); *G01S 1/763* (2013.01)
USPC ........................... 367/125; 367/123; 367/118

(58) Field of Classification Search
None
See application file for complete search history.

(56) References Cited

U.S. PATENT DOCUMENTS

| | | | |
|---|---|---|---|
| 4,555,779 A | 11/1985 | Roberts | |
| 7,408,839 B2 * | 8/2008 | McFarland | 367/124 |
| 2011/0007606 A1 * | 1/2011 | Curtis | 367/103 |

FOREIGN PATENT DOCUMENTS

| | | |
|---|---|---|
| FR | 2 722 883 A1 | 1/1996 |
| GB | 2 113 391 A | 8/1983 |

OTHER PUBLICATIONS

Vaganay J et al.: "Homing by acoustic ranging to a single beacon", Oceans 2000 MTS/IEEE Conference and Exhibition Sep. 11-14, 2000, Piscataway, NJ USA. IEEE, vol. 2. Sep. 11, 2000, pp. 1457-1462, XP010521023, ISBN: 978-0-7803-6551-3 cited in the application abstract p. 1458, col. 1, line 27-line 29 p. 1458, col. 1, line 41-line 44 p. 1459, col. 1, line 4.

(Continued)

*Primary Examiner* — Ian J Lobo
*Assistant Examiner* — Hovhannes Baghdasaryan
(74) *Attorney, Agent, or Firm* — Young & Thompson

(57) ABSTRACT

An acoustic positioning device includes an acoustic emitter and receiver. The device emits a sequence of at least one first acoustic signal (S1) and one second acoustic signal (S2), separated by a time interval T, and to receive and measure the arrival phase $\phi_1$ of S1 and the arrival phase $\phi_2$ of S2. The device measures a relative displacement between the acoustic emitter and the acoustic receiver and determines the approximate difference $(R2-R1)_{AUX}$ between the distance R1 traveled by S1 between the acoustic emitter and receiver, and the distance R2 traveled by S2 between the acoustic emitter and the acoustic receiver, and calculates the relative displacement (R2-R1) between the acoustic emitter and the acoustic receiver as a function of the approximate difference $(R2-R1)_{AUX}$, of the time interval T and of the arrival phases $\phi_1$, $\phi_2$ respectively of S1 and of S2.

20 Claims, 3 Drawing Sheets

(56) References Cited

OTHER PUBLICATIONS

Alexander Ph. Scherbatywk "The AUV Positioning Using Ranges from One Transponder LBL", Institute for Marine Technology Problems Far East Branch of the Russian Academy of Sciences, 5a Sukhanov Street, Vladivostok, 690600 Russia, p. 1620-1623.

Jessica R. Lacy et al., "Accuracy of a Pulse-Coherent Acoustic Doppler Profiler in a Wave-Dominated Flow", Journal of Atmospheric and Oceanic Technology, vol. 21, Manuscript received May 9, 2003, in final form Feb. 4, 2004, p. 1448-1461.

Alison Keary et al.: "Simulation of the Correlation Velocity Log Using a Computer Based Acoustic Model", Department of Mechanical Engineering, Institute of Sound and Vibration.

Blair H. B et al. "Performance of a Broad-Band Acoustic Doppler Current Profiler" IEEE Journal of Oceanic Engineering, vol. 16, No. 4, October 1991, p. 402-407.

Keith Vickery, Acoustic Positioning Systems "A Practical Overview of Current Systems", Dynamic Positioning Conference, Oct. 13-14, 1998 Sensors, Acoustic Positioning Systems, p. 2-16.

International Search Report, dated Jan. 3, 2013, from corresponding PCT application.

* cited by examiner

ACOUSTIC POSITIONING SYSTEM AND METHOD

The present invention relates to a device and a method for positioning a mobile with respect to one or several references. More precisely, the invention relates to an acoustic device for measuring a relative displacement of a mobile with respect to one or several reference, this measurement being based on the transmission of acoustic signals between the mobile and the reference(s). The invention advantageously allows accurate measurements, whose accuracy is independent of the range of the acoustic emission/reception device.

Different positioning devices and methods are known, which are based on the use of acoustic waves. Many systems exist for measuring a relative displacement between a mobile and one or several references by acoustic waves.

For example, a method consists in measuring the travel time of an acoustic wave between an emitter and a receiver by providing a matched filter on the receiver and by determining thanks to this matched filter the time of arrival of the acoustic wave by searching for the correlation maximum. Knowing the time of emission of the signal and the speed of sound in the medium, determining the time of arrival allows to determine the distance between the emitter and the receiver. The accuracy of the distance measurement is of the order of $C/(B*\sqrt{(RSB)})$, where B is the bandwidth of the signal, C the speed of sound in the medium and RSB the signal-to-noise ratio. This methodology is used for example in the so-called "long-base" underwater positioning systems (see for example <<Acoustic Positioning Systems, a practical overview of current systems>>, Keith Vickery, DYNAMIC POSITIONING CONFERENCE, Oct. 13-14, 1998). Nevertheless, as can be seen in the distance measurement accuracy formula, this method imposes, to obtain the best accuracies, using wide-band (and thus high-frequency) waves and having a good signal-to-noise ratio. For example, using this method in water (C=1500 m/s), with a signal of central frequency 10 kHz, of bandwidth 1 kHz and a (very good) signal-to-noise ratio of 10 dB, leads to an inaccuracy of 5 cm, which is insufficient for many applications. This method is thus limited in accuracy at a given frequency. However, the increase of accuracy allowed by an increase of frequency leads to a decrease of the range (the high-frequency waves not propagating as well as the low-frequency waves).

Another method consists in determining the frequency offset of an acoustic signal between an emitter and a receiver. This offset, called the Doppler offset, is proportional to the frequency F of the signal used: DOPPLER=(V/C)F, where V is the speed that is to be determined and C is the speed of sound in the medium. The Doppler offset being proportional to the frequency F of the acoustic signal, it is necessary to use high-frequency signals to improve the accuracy of the device. For example, using this method in water (C=1500 m/s) with a signal at 10 kHz and a capacity of discriminating frequencies of 10 Hz leads to an inaccuracy of speed determination of 0.15 m/s, which is incompatible with the majority of the applications. The necessity to use high frequencies leads to a reduction of the range and thus limits the use of this methodology.

Another method consists in measuring on a multi-receiver antenna the phase differences of a same signal received on the different receivers and deducing therefrom the direction of the incident signal. This methodology is used for example in the so-called "ultra-short base" underwater positioning systems (see for example <<Acoustic Positioning Systems, a practical overview of current systems>>, Keith Vickery, DYNAMIC POSITIONING CONFERENCE Oct. 13-14, 1998). Nevertheless, and although the determination of the phase differences of such a device is accurate typically to better than $1/30$ radian, this method requires a reception antenna that is not only complex, because multi-receiver, but also of great size (typically one wavelength). For example, using this method in water (C=1500 m/s) with a signal at 10 kHz (of wavelength $\lambda$ equal to 0.15 m), an antenna of 0.15 m and an accuracy of measurement of the phase differences of $1/30$ radian, leads to an uncertainty of 2 degrees on the direction of the incident signal. Projected for example at a distance of 600 m, this angular uncertainty leads to an uncertainty of positioning of the source of the received wave of more than 20 m. This method is thus limited in precision at high range, except supposing the use of a reception antenna of too great size for the majority of the practical applications.

Another method, described in the document GB2113391A1, consists in an acoustic positioning system comprising an emitting module and an acoustic receiving module, connected by an electric connection cable. The emitting module comprises a first, a second and a third acoustic emitters operable to emit a first acoustic signal, a second acoustic signal and a third acoustic signal, respectively, of same frequency, separated by determined time intervals. The clock of the receiving module allows to synchronize the emission of the acoustic signals. The acoustic receiver measures the time intervals between the emitted acoustic signals and the received acoustic signals, to deduce therefrom the positioning of the acoustic receiver relative to the three emitters.

Another method, called the correlation log, consists in using an antenna comprising an emitter and at least three acoustic receivers. The principle of the correlation log method consists in emitting an acoustic signal that, during its propagation, reflects on the interfaces of the medium, and correlating the return signals received on the different acoustic receivers with respect to one another to deduce therefrom the speed of the antenna relative to the reflecting interfaces (see for example <<Simulation of the correlation velocity log using a computer based acoustic model>>, Alison Keary, Martyn Hill, Paul White, Henry Robinson, 11th International Symposium Unmanned Untethered Submersible Technology, Durham, USA, August 1999., 446-454). This method allows to determine the speed of the multi-receiver reception antenna with respect to the medium. However, this method requires, as the ultra-short base method, the use of a multi-receiver antenna and thus an antenna that is both complex and of great size, which limits the practical use thereof.

Another method, called the wide-band Doppler log, consists in using an antenna comprising several acoustic emitters-receivers (one by direction observed). The principle of the wide-band Doppler log consists, for each emitter-receiver couple, in emitting successively two acoustic waves that, during their propagation, reflect on the interfaces of the medium, then in measuring on the corresponding receiver the phase differences of the two return signals, to deduce therefrom the speed (see for example <<Performance of a Broad-Band Acoustic Doppler Current Profiler>>, Blair H. Brumley, Ramon G. Cabrera, Kent L. Deines, and Eugene A. Terray, IEEE JOURNAL OF OCEANIC ENGINEERING, VOL. 16, NO. 4, OCTOBER 1991 and <<Accuracy of a Pulse-Coherent Acoustic Doppler Profiler in a Wave-Dominated Flow>>, JESSICA R. LACY, CHRISTOPHER R. SHERWOOD, Journal of Atmospheric and Oceanic Technology, vol. 21, 2004, pp. 1448-1461). Each emitter-receiver allows to determine the speed of the antenna in the direction of the emitted wave. It is therefore necessary to have an antenna with at least three emitters-receivers so as to determine fully the speed of the antenna carrier. Moreover, in order to obtain an accurate speed, it is necessary that the emitted wave has a small opening, typically of a few degrees, which implies that the acoustic transducers are of great size with respect to the emitted wavelength. For example, to use this method with waves of frequency 100 kHz, it is typically required, in order to obtain beams of 3 degrees, to use transducers of 20 cm of diameter. This method is thus limited in practice to waves of high frequency (typically from a few hundreds of kilo-hertz), in order not to have too great sizes of antenna. As the high-frequency waves attenuate rapidly in the medium, this method, besides it imposes the use of complex antennas, is in practice highly limited in range.

It can be further noticed that the methods of the acoustic log type, such as the above-mentioned correlation log method and the wide-band Doppler log method, do not allow to position a mobile in a passive and discrete manner, i.e. in such a way that the mobile do not emit acoustic signals.

Each of these different acoustic methods is commonly used in many applications, from metrology to navigation of underwater vehicles, through robotics. On the other hand, as seen hereinabove, these different methods suffer from practical limitations in terms of performance or use. The cited methods have many variants and are often used in combination. The combination of these methods between each other or with other auxiliary means (see for example the reference: <<The AUV positioning using ranges from one transponder LBL>>, Alexander Ph. Scherbatyuk, OCEAN 1995) allows to reduce a part of the limitations. For example, the document J. Vaganay et al., <<Homing by acoustic ranging to a single beacon>>, Oceans 2000 MTS/IEEE Conference and Exhibition, Sep. 11-14, 2000, IEEE, Vol. 2 P. 1457-1462, describes a method for acoustic positioning of a mobile relative to a beacon, consisting in obtaining a first estimation of the position of the mobile and in refining the first estimation during the displacement of the mobile by using a Kalman filter. Nevertheless, by nature, these various combinations do not allow to solve the fundamental limitations, in particular regarding accuracy, range, complexity and size of antenna, non-discretion, inherent to each of the acoustic measurement methods.

Therefore, a need exists for a small-size and low-cost acoustic positioning device allowing to obtain very good performance at high range. In particular, a need exists for such a device whose performance is basically independent of the range. In particular, a need exists for such a device requiring no great-size antenna on the reference or on the mobile. In particular, a need exists for such a device allowing to position a mobile in a passive manner, i.e. without the need for the mobile to emit acoustic waves.

One of the objects of the invention is to provide a device and a method for measuring the relative position of an object with respect to one or several references based on the propagation of acoustic waves between the different elements and allowing to obtain a positioning accuracy equal to a fraction of the acoustic wavelength used and independent of the distance, while using small-size and low-cost elements.

The present invention has for object to remedy the drawbacks of the prior art techniques and relates more particularly to an acoustic positioning system comprising acoustic emission means and acoustic reception means, the acoustic emission means comprising an acoustic emitter and an emitter clock, said acoustic emission means being configured so as to emit a sequence of at least one first acoustic signal S1 and one second acoustic signal S2 of same central acoustic frequency f, separated by a determined time interval T, said acoustic reception means comprising an acoustic receiver and a receiver clock, said acoustic reception means being operable to receive and to measure the phase of arrival $\phi_1$ of the first acoustic signal S1 and the phase of arrival $\phi_2$ of the second acoustic signal S2 on said acoustic receiver, said phases of arrival $\phi_1$, $\phi_2$ being measured with respect to a reference oscillator.

According to the invention, the emitter clock and the receiver clock are asynchronous, and said system comprises means for measuring the relative radial displacement between said acoustic emitter and said acoustic receiver, said measuring means comprising:

auxiliary means for evaluating, with an accuracy of one half-wavelength, an estimation of the radial displacement $(R2-R1)_{AUX}$ between, on the one hand, the distance R1 traveled by the first acoustic signal S1 between said acoustic emitter and said acoustic receiver, and on the other hand, the distance R2 traveled by the second acoustic signal S2 between said acoustic emitter and said acoustic receiver, and means for calculating the relative displacement (R2−R1) between said acoustic emitter and said acoustic receiver as a function of the estimation of the radial displacement $(R2-R1)_{AUX}$, of the time interval T and of the phases of arrival $\phi_1$, $\phi_2$, respectively, of the first acoustic signal S1 and of the second acoustic signal S2.

According to a preferred embodiment of the acoustic positioning system of the invention, the central acoustic frequency of the acoustic signals S1 and S2 being equal to f the calculation means are configured to determine accurately the relative displacement (R2−R1) according to the following formulas:

Determination of the single integer K, such that:

$$\frac{\varphi_2}{2\pi} - \frac{\varphi_1}{2\pi} - (fT - [fT]) + \qquad (I)$$

$$K \text{ is in the interval } \left[\frac{(R_2 - R_1)_{AUX}}{\lambda} - \frac{1}{2}, \frac{(R_2 - R_1)_{AUX}}{\lambda} + \frac{1}{2}\right[$$

Calculation of:

$$R2 - R1 = \lambda \times \frac{\varphi_2}{2\pi} - \lambda \times \frac{\varphi_1}{2\pi} + K\lambda - \lambda \times (fT - [fT]) \qquad (II)$$

where $\lambda$ represents the wavelength at the acoustic frequency f and [fT] represents the integer part of the product of the acoustic frequency f by the time interval T, i.e. the greatest integer number strictly lower than fT.

According to various particular aspects of the acoustic positioning system of the invention:

the acoustic emission means comprise an acoustic emitter and the acoustic reception means comprise an acoustic receiver and the system allows measuring accurately the relative radial displacement between the acoustic emitter and the acoustic receiver during a time interval T;

the acoustic emission means comprise at least two acoustic emitters and the acoustic reception means comprise one acoustic receiver and the system allows measuring the relative radial displacement between each of the couples formed by one acoustic emitter and the acoustic receiver, respectively;

the acoustic emission means comprise one acoustic emitter and the acoustic reception means comprise at least two acoustic receivers and the system allows measuring the relative radial displacement between each of the couples formed by the acoustic emitter and one acoustic receiver, respectively.

According to other particular aspects of the invention, the auxiliary means for evaluating the estimation of the radial displacement $(R2-R1)_{AUX}$ comprise one or several of the following means:
- a means for determining the speed $V_{AUX}$ of the relative displacement between said acoustic emitter and said acoustic receiver, based on the estimation of the Doppler offset of the acoustic waves transmitted between said acoustic emitter and said acoustic receiver:

$$(R2-R1)_{AUX} = V_{AUX}T = \frac{C}{F}\text{DOPPLER} \times T$$

- a means for determining the difference $(T2-T1)_{AUX}$ of the respective travel times of the acoustic signals S1 and S2 between said acoustic emitter and said acoustic receiver:

$$(R2-R1)_{AUX} \approx c(T2-T1)_{AUX}$$

where $(T2-T1)_{AUX}$ is the estimated travel time difference;
- an inertial means for measuring the estimation of the radial displacement $(R2-R1)_{AUX}$, said inertial means being based on the use of one or several accelerometers, or on the use of one or several inertial measurement units comprising gyroscopes and accelerometers, or on the use of one or several inertial navigation unit systems hybridized with other external positioning means.

According to another particular aspect of the invention, the estimation of the radial displacement $(R2-R1)_{AUX}$ may be supposed to be known a priori and equal to zero provided that the radial speed of displacement between said acoustic emitter and said acoustic receiver is low enough:

In the case where the radial speed V of relative displacement between the emitter and the receiver is such that the product of the time interval T by the radial speed V of relative displacement between the acoustic emitter and the acoustic receiver being such that $$-\frac{\lambda}{2} < VT < \frac{\lambda}{2},$$

it may be said that the estimation of the radial displacement $(R2-R1)_{AUX}$ is equal to zero.

According to other particular aspects of a first acoustic positioning system of the invention, the auxiliary means for evaluating the approximate difference $(R2-R1)_{AUX}$ comprise a second acoustic positioning system having one of the following characteristics:
- the second system operates at a lower acoustic frequency or at a higher rate than the first acoustic positioning system, so that the relative displacement of the mobile with respect to the second system is smaller than one half-wavelength between two successive acoustic emissions of the second system;
- the second system is arranged in such a manner that the displacement of the mobile with respect to the second system is smaller than one half-wavelength between two successive acoustic emissions of the second system.

The invention also relates to a method for relative positioning between acoustic emission means and acoustic reception means, said acoustic emission means comprising an acoustic emitter and an emitter clock and said acoustic reception means comprising an acoustic receiver and a receiver clock, the emitter clock and the receiver clock being asynchronous, said method comprising the following steps:

- emitting, by said acoustic emitter, a sequence of at least one first acoustic signal S1 and one second acoustic signal S2, of same central acoustic frequency f separated by a time interval T determined by said emitter clock,
- receiving and measuring the phase of arrival $\phi_1$ of the first acoustic signal S1 and the phase of arrival $\phi_2$ of the second acoustic signal S2 on said acoustic reception means comprising an acoustic receiver (B2) and a receiver clock, said phases of arrival $\phi_1$, $\phi_2$ being measured with respect to a reference oscillator,
- evaluating, with an accuracy of one half-wavelength, an estimation of the radial displacement $(R2-R1)_{AUX}$ between, on the one hand, the distance R1 traveled by the first acoustic signal S1 between the acoustic emitter and the acoustic receiver, and on the other hand, the distance R2 traveled by the second acoustic signal S2 between the acoustic emitter and the acoustic receiver,
- calculating the relative displacement (R2-R1) between said acoustic emission means and said acoustic reception means as a function of the estimation of the radial displacement $(R2-R1)_{AUX}$, of the time interval T and of the phases of arrival $\phi_1$, $\phi_2$, respectively, of the first acoustic signal S1 and of the second acoustic signal S2.

The invention will find a particularly advantageous application in the acoustic positioning and/or navigation systems.

The present invention also relates to the characteristics that will become more apparent from the following description and that will have to be considered in isolation or according to any of their technically possible combinations.

This description, which is given only by way of non-limitative example, will permit to better understand how the invention can be implemented with reference to the appended drawings, in which:

FIG. 1 schematically shows a device with an emitter and an acoustic receiver, the emitter being shown at two times of emission of acoustic waves, and the acoustic receiver at two times of reception of acoustic waves;

Figure 4:
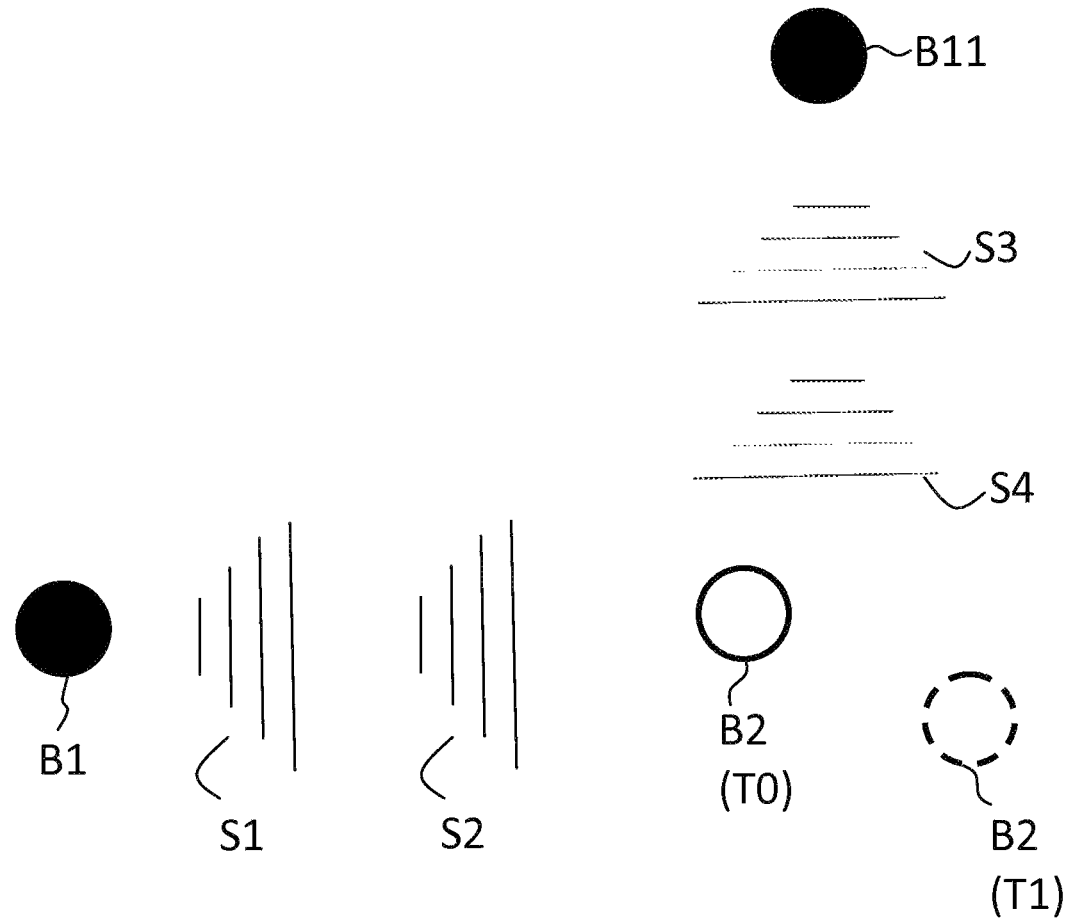
Figure 5:
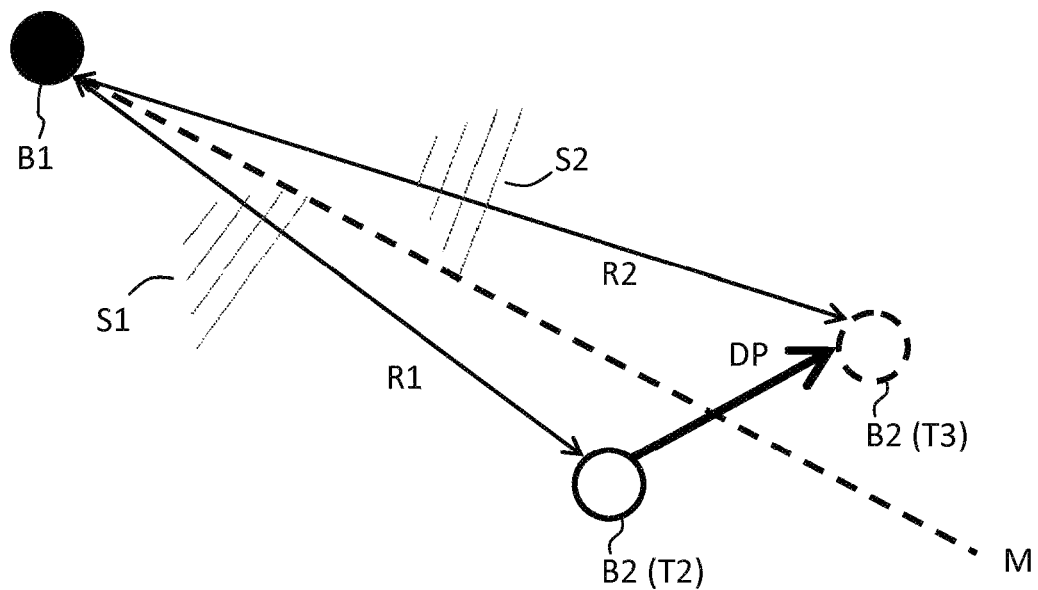
Figure 6:
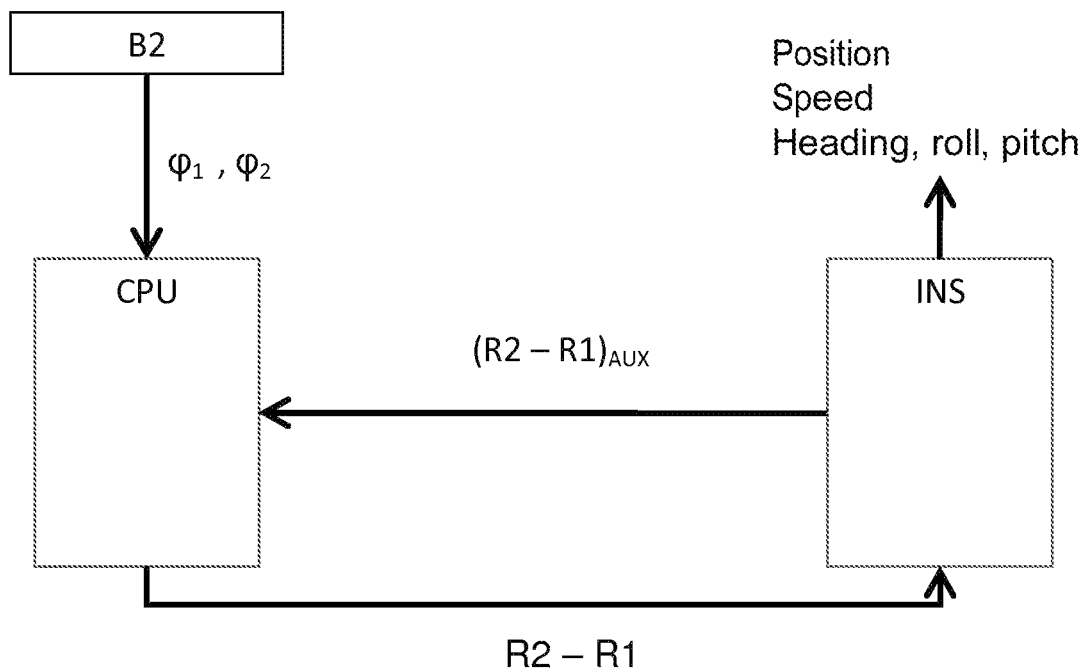

FIG. 4 schematically shows a device, based on the use of a mobile receiver and of two fixed emitters, and allowing to estimate the movement of the mobile in a plane;

FIG. 5 schematically shows a device with a fixed acoustic emitter and a mobile acoustic receiver moving in space;

FIG. 6 schematically shows a device in which the data of the acoustic receiver are hybridized with the data of an inertial navigation system.

Figure 1:
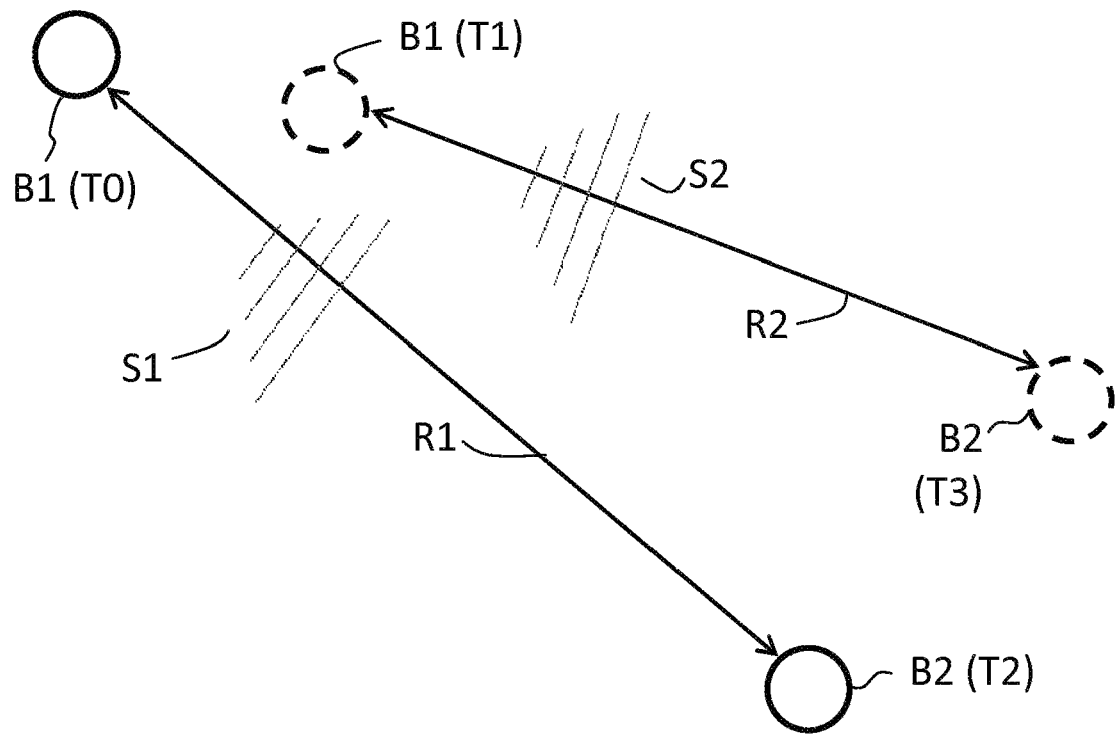

FIG. 1 schematically illustrates the operation of an acoustic positioning device according to a first embodiment. The device comprises an acoustic emitter B1 carried, for example, by a reference carrier, and an acoustic receiver B2 carried, for example, by a mobile vehicle. The acoustic emitter B1 is shown at two times of emission of the acoustic signals S1 and S2, i.e. at times T0 and T1, where T1=T0+T. The acoustic receiver B2 is shown at two times of reception of the acoustic signals S1 and S2, i.e. at times T2 and T3. The distance R1 is the distance traveled by the first acoustic signal S1 between the emitter B1 at time T0 and the receiver B2 at time T2. The distance R2 is the distance traveled by the second acoustic signal S2 between the emitter B1 at time T1 and the receiver B2 at time T3. In FIG. 1, the emitter B1 and the receiver B2 are mobile. It is desired to measure the relative radial displacement between the emitter B1 and the receiver B2 during the time interval T, or in other words, the variation of the distance between the two points during the time interval considered.

A calculator allows to determine accurately the distance R2−R1, based on the parameters T, on the phases measured at each of the receptions and on an approximate value $(R2-R1)_{AUX}$ of R2−R1 to better than one half-wavelength, thanks to the following algorithm:

Determining the single integer K such that:

$$\frac{\varphi_2}{2\pi} - \frac{\varphi_1}{2\pi} - (fT - [fT]) + \qquad (I)$$

$$K \text{ is in the interval } \left[\frac{(R_2-R_1)_{AUX}}{\lambda} - \frac{1}{2}, \frac{(R_2-R_1)_{AUX}}{\lambda} + \frac{1}{2}\right[$$

Calculating:

$$R2 - R1 = \lambda \times \frac{\varphi_2}{2\pi} - \lambda \times \frac{\varphi_1}{2\pi} + K\lambda - \lambda \times (fT - [fT]) \qquad (II)$$

where λ represents the acoustic wavelength of the acoustic signals S1 and S2 and [fT] represents the integer part of the product of the central acoustic frequency f by the time interval T, i.e. the greatest integer number strictly lower than fT.

As seen in the two steps of the algorithm for calculating the relative displacement (R2−R1), the accuracy of the device is affected by the good knowledge of the term fT. In the case of acoustic waves, the frequency f of the acoustic signals that is used is generally relatively low (typically a few kHz to a few hundreds of kHz). A high-accuracy clock is therefore not required for the operation of the device as an approximate control of T is sufficient.

For example, supposing that the device operates in water (C=1500 m/s) with signals of central frequency 10 kHz (λ=0.15 m), an interval T of 1 second between the successively emitted signals and a clock with a drift of 5 ppm, the clock drift only contributes to an error of at most 1/20 of the wavelength, i.e. less than 0.75 cm.

The device of the invention thus allows measuring accurately the relative displacement R2−R1 between the emitter B1 and the receiver B2 over time with an accuracy equal to a fraction of the wavelength λ of the acoustic signal used (typically 1/10 to 1/100 of the wavelength as a function of the different signal and clock characteristics retained) and thus with an accuracy at least one order of magnitude better than the conventional methods.

For example, supposing that the device operates in water (C=1500 m/s) with signals of central frequency 10 kHz (λ=0.15 m), the accuracy of the device will be, according to the signal-to-noise ratio, to the performance of the phase detector and of the other elements of the device, of the order of 0.15 cm to 1.5 cm whereas, as seen hereinabove, a prior art method, using waves of comparable frequency, based on the detection of the times of arrival, would lead to an accuracy of the order of 5 cm.

For example, the use of this embodiment in water (C=1500 m/s) with a signal at 10 kHz (λ=0.15 m) allows obtaining a positioning accuracy typically of the order of 1/30 of the wavelength, i.e. 0.5 cm, ten times better than a method of the long-base type using waves of same frequency as described hereinabove.

The invention allows to obtain a measurement accuracy independent of the distance between the emitter and the receiver, provided that the celerity profile is known.

The invention allows to use acoustic waves of lower frequency than the prior devices for a same measurement accuracy.

For example, to obtain an accuracy of the order of 0.5 cm with a method based on the detection of the travel time of the acoustic signal, it is required, supposing a (very good) signal-to-noise ratio of 10 dB, to use waves with a bandwidth higher than 10 kHz, i.e. typically of central frequency 50 kHz. As seen hereinabove, the invention allows to obtain better performance with waves of frequency 10 kHz, which therefore propagate far better at great distance in the medium.

The invention thus allows to obtain very good positioning performance at very high range with a gain of one order of magnitude with respect to the conventional methods.

The device of the invention does not need an accurate clock to operate; a clock with a stability of a few ppm is sufficient. In particular, the device of the invention does not require synchronizing the clocks of the receiver and of the emitter to operate.

The device of the invention allows to position accurately a mobile on which is fixed an acoustic device operating only in reception, i.e. in passive listening only, and thus with the correlative advantages of discretion, on-board energy saving, possibility to position multiple mobiles on a same area without interference.

The device of the invention is based on simple elements commonly used in acoustics and available for a low cost (acoustic emitter and receiver, calculator).

The device of the invention allows to obtain very good performance using small-size elements because it does not necessitate the use of a multi-sensor antenna.

The above description presents the simplest configuration of the device. This configuration may be adapted as a function of the problem to be solved, as described in particular in the following sections.

Forms of the Signals Emitted

The waveform of the acoustic signals used may be of any nature commonly used in acoustics: pure-frequency signals, frequency-modulated signals, phase-modulated signals, etc.

The signals may be chosen so as to have a more or less high sensitivity to the Doppler offset, which sensitivity may then be compensated for or not by the calculation. In the case where it is chosen to compensate for this sensitivity, the compensation is translated in practice by a correction of the terms λ and f in the formulas of calculation.

The waveforms of the acoustic signals successively sent by the emitter may be different without it affects the formulas of calculation, provided that their central frequency is the same.

More than two successive emissions may be used and the signals emitted over time as well as the time intervals between the different signals may be different.

Number of Elements of the Device

The number of acoustic emission and/or reception means has to be adapted to the dimension of the problem to be solved as well as to the other constraints of the environment.

Figure 2:
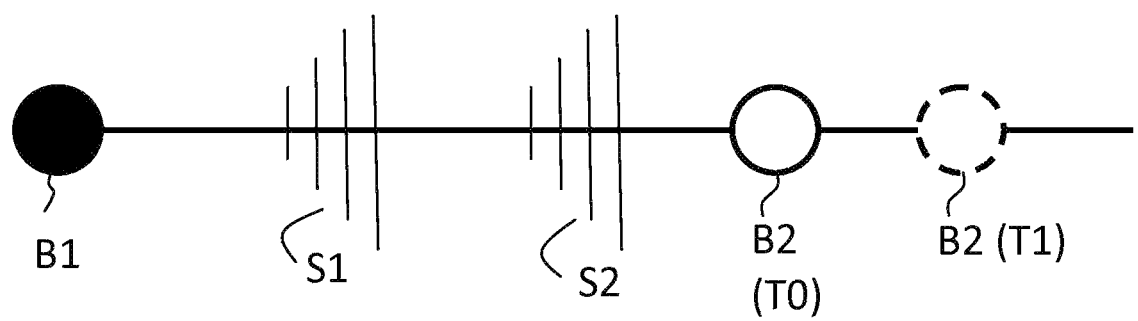
FIG. 2 shows a particular embodiment in which the relative displacement between the emitter and the receiver is constrained following one dimension and only the receiver moves over time.

FIG. 2 schematically shows an acoustic positioning device according to a particular embodiment, wherein the acoustic emitter B1 is fixed and the acoustic receiver B2 is on a mobile whose displacement is constrained following a geometric line. In this case, it is sufficient to use one emitter and one receiver to fully determine the displacement of the mobile.

Figure 3:
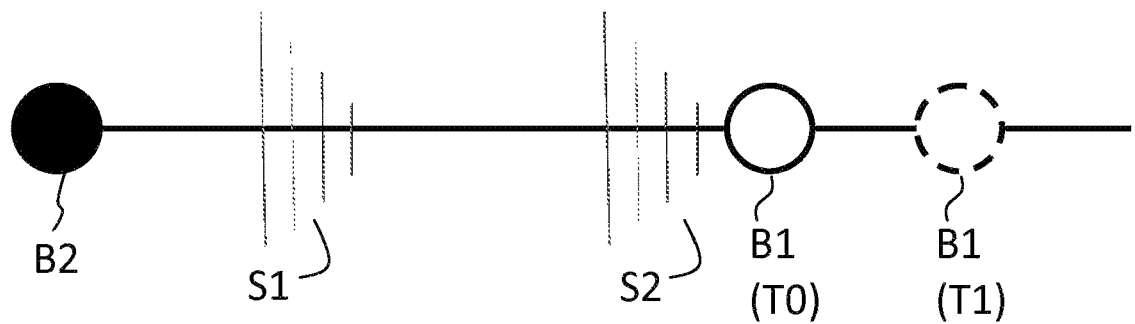
FIG. 3 shows a particular embodiment in which the relative displacement between the emitter and the receiver is constrained following one dimension and only the emitter moves over time.

FIG. 3 schematically shows an acoustic positioning device according to another particular embodiment, wherein the acoustic receiver B2 is fixed and the acoustic emitter B1 is on a mobile whose displacement is constrained following a geometric line. In this case too, it is sufficient to use one emitter and one receiver to fully determine the displacement of the mobile.

FIG. 4 schematically shows an acoustic device according to another embodiment, in the case of a mobile moving on a plane. In this case, it is necessary to use at least two fixed emitters B1 and B11 and one receiver B2 on the mobile to fully determine the displacement of the mobile. Alternatively, it is also possible to use at least one emitter on the mobile and two fixed receivers. In the case of a mobile moving in the three-dimensional space, it is necessary to use at least three emitters and one receiver or at least one emitter and three receivers to fully determine the displacement of the mobile. As above, it is possible to place indifferently the single acoustic emission means on the mobile and the acoustic reception means on the references or the single acoustic reception means on the mobile and the acoustic emission means on references.

FIG. 5 schematically shows an acoustic device according to another embodiment, in the case of a mobile including an acoustic receiver and moving with respect to a fixed reference including an acoustic emitter. The mobile includes an inertial displacement measuring means providing, on the one hand, an estimation of the displacement DP in space between the two times of reception of the waves S1 and S2, and on the other hand, an estimation of the bisecting direction M of the directions of the vectors R1 and R2. An estimation of the radial displacement $(R2-R1)_{AUX}$ is given by the following scalar product: $(R2-R1)_{AUX}=\vec{DP}\cdot\vec{u}$, where $\vec{u}$ is the unit vector following M oriented from the fixed reference to the mobile.

According to still another embodiment, the number of acoustic emission or reception means may be increased to cover a larger area or to ensure a redundancy of the whole device.

Joint Use with an Inertial Measuring Means

As mentioned above, the device may be advantageously combined with an inertial means for measuring the movement. In this case, it is particularly advantageous to make a hybridization between these two means.

Such a hybridization is described hereinafter and illustrated in FIG. 6. In this example, a mobile comprising an acoustic receiver B2, a calculator CPU and an inertial navigation system INS is considered. It is supposed that an acoustic emitter is fixed at a known point and emits sequences of two signals S1, S2, as described hereinabove.

At each time:
the acoustic receiver B2 determines the phases of arrival $\phi_1$ and $\phi_2$ of the signals S1 and S2, respectively, and transmits them to the calculator;
the inertial navigation system INS determines a value of the approximate difference $(R2-R1)_{AUX}$ of the radial displacement of the mobile with respect to the emitter having a known position and transmits this value of the approximate difference $(R2-R1)_{AUX}$ to the calculator CPU; as can be seen in FIG. 5, this value of the approximate difference $(R2-R1)_{AUX}$ is easily determined based on an estimation of the displacement of the inertial system, of its initial position and of the known position of the emitter;
the calculator determines according to the method of the invention a corrected value $(R2-R1)$ of the relative radial displacement of the mobile with respect to the emitter and transmits it to the inertial navigation system;
the inertial navigation system uses (for example thanks to a Kalman filter) the corrected value of the relative displacement $(R2-R1)$ so as to correct the estimation of its internal parameters.

In order for this method to operate, it is necessary, as indicated in the description of the invention, that the estimation of the approximate difference $(R2-R1)_{AUX}$ by the inertial system, is accurate to better than one half-wavelength. This accuracy need allows determining the class of performance of the required inertial system.

For example, supposing that the system operates in water (C=1500 m/s) with signals of central frequency 10 kHz ($\lambda$=0.15 m), that the mobile is at a distance of 1000 m of the emitter and that its position is known with an uncertainty of 1 m, it is sufficient, for the device to operate, that the inertial system drifts by less than 7.5 cm between the reception of the two signals S1 and S2. In the case where the time interval between the signals S1 and S2 is of the order of 1 second, it is hence sufficient that the inertial system drifts by less than 7.5 cm in 1 second. Inertial navigation systems of this class of performance are available in the market. It can be cited, for example, the inertial system PHINS of the iXSea company.

Of course, if the class of the inertial system is not sufficient, it is possible, in order to improve the performance thereof, to further hybridize it with another positioning means. For example, in an undersea application, the inertial system may be hybridized with a Doppler log.

Apart from the fact that the combination of the method of the invention with an inertial navigation system allows to obtain the required approximate estimations $(R2-R1)_{AUX}$, the hybridization also includes a great number of additional advantages that will become immediately evident for the one skilled in the art. In particular, the hybridization allows to obtain a better performance than the combination of the two systems. The hybridization allows to obtain high-rate data and not to be limited to the rate of the acoustic waves. The hybridization allows obtaining an accurate position in space with a single reference beacon, taking advantage of the movements of the mobile over time to solve the various ambiguities.

Finally, it is to be noted that such a system allows positioning the mobile in a fully passive way, and thus with the correlative advantages of discretion, on-board energy saving, possibility to position multiple mobiles on a same area without interference.

Other Characteristics

In the above description, no reference is made to the means triggering the acoustic emissions. All the means may be used as a function of the other features of the system.

For example, the acoustic emissions may be triggered by an electric or an acoustic signal.

For example, this electric or acoustic signal may be sent by the means used in reception or by the means used in emission in the device of the invention.

The acoustic signals transiting between the different elements of the system may carry additional information used or not within the framework of the movement measurement.

For example, the signals may contain information about the state of the emitter and in particular about its position following one or several of the three axes in space.

This additional information may be used or not to solve the wavelength ambiguities.

The celerity profile information (knowledge of C along the acoustic path) may be determined by any conventional means and used in delayed time or in real time. They may also be estimated jointly with the positioning.

Applications

The method and the device of the invention have many applications, in particular in the field of robotics, navigation and metrology.

For example, the invention and the device may be used to position very accurately the elements of a working robot with respect to reference elements in its environment.

For example, the invention and the device may be used for determining accurately the movements of a vehicle progressing on an area previously equipped with reference systems. In particular, the invention and the device may be used to determine the movements of intervention or measurement robots in dangerous environments (mines, radioactive environment, . . . ) or in environments of difficult access (undersea depths, uninhabited areas, . . . ).

For example, the invention and the device may be used to realize accurate operations of metrology using measuring systems moving between the different elements to be positioned and whose movements are determined by means of the invention.

The invention claimed is:

1. An acoustic positioning system comprising:
acoustic emission means (B1); and
acoustic reception means (B2);
wherein the acoustic emission means comprises an acoustic emitter (B1) and an emitter clock, said acoustic emission means being configured so as to emit a sequence of at least one first acoustic signal S1 and one second acoustic signal S2 of same central acoustic frequency f, separated by a determined time interval T, said acoustic reception means comprising an acoustic receiver (B2) and a receiver clock, said acoustic reception means being operable to receive and to measure the phase of arrival $\phi_1$ of the first acoustic signal S1 and the phase of arrival $\phi_2$ of the second acoustic signal S2 on said acoustic receiver (B2), said phases of arrival $\phi_1$, $\phi_2$ being measured with respect to a reference oscillator; and
wherein:
the emitter clock and the receiver clock are asynchronous,
said system comprises means for measuring the relative radial displacement between said acoustic emitter (B1) and said acoustic receiver (B2), said measuring means comprising:
auxiliary means for evaluating, with an accuracy of one half-wavelength, an estimation of the radial displacement $(R2-R1)_{AUX}$ between, on the one hand, the distance R1 traveled by the first acoustic signal S1 between said acoustic emitter (B1) and said acoustic receiver (B2), and on the other hand, the distance R2 traveled by the second acoustic signal S2 between said acoustic emitter (B1) and said acoustic receiver (B2); and
means for calculating the relative displacement (R2-R1) between said acoustic emitter (B1) and said acoustic receiver (B2) as a function of the estimation of the radial displacement $(R2-R1)_{AUX}$, of the time interval T and of the phases of arrival $\phi_1$, $\phi_2$, respectively, of the first acoustic signal S1 and of the second acoustic signal S2.

2. The acoustic positioning system according to claim 1, wherein the central acoustic frequency of the acoustic signals S1 and S2 being equal to f, the calculation means being configured to determine the relative displacement (R2-R1) according to the following formulas:

Determination of the single integer K, such that:

$$\frac{\varphi_2}{2\pi} - \frac{\varphi_1}{2\pi} - (fT - [fT]) + \qquad (I)$$

$$K \text{ is in the interval } \left[\frac{(R_2 - R_1)_{AUX}}{\lambda} - \frac{1}{2}, \frac{(R_2 - R_1)_{AUX}}{\lambda} + \frac{1}{2}\right[$$

Calculation of:

$$R2 - R1 = \lambda \times \frac{\varphi_2}{2\pi} - \lambda \times \frac{\varphi_1}{2\pi} + K\lambda - \lambda \times (fT - [fT]) \qquad (II)$$

where $\lambda$ represents the wavelength at the acoustic frequency f and [fT] represents the integer part of the product of the acoustic frequency f by the time interval T.

3. The acoustic positioning system according to claim 2, wherein the acoustic emission means comprise at least two acoustic emitters (B1, B11) and the acoustic reception means comprise one acoustic receiver (B2) and wherein the system allows measuring the relative radial displacement between each of the couples formed by one acoustic emitter (B1, B11) and the acoustic receiver (B2), respectively.

4. The acoustic positioning system according to claim 2, wherein the acoustic emission means comprise one acoustic emitter (B1) and the acoustic reception means comprise at least two acoustic receivers (B2, B22) and wherein the system allows measuring the relative radial displacement between each of the couples formed by the acoustic emitter (B1) and one acoustic receiver (B2, B22), respectively.

5. The acoustic positioning system according to claim 2, wherein the auxiliary means for evaluating the estimation of the radial displacement $(R2-R1)_{AUX}$ comprise a means for determining the speed $V_{AUX}$ of the relative displacement between said acoustic emitter (B1) and said acoustic receiver (B2), based on the estimation of the Doppler offset of the acoustic waves transmitted between said acoustic emitter (B1) and said acoustic receiver (B2):

$$(R2 - R1)_{AUX} = V_{AUX}T = \frac{C}{F}\text{DOPPLER} \times T.$$

6. The acoustic positioning system according to claim 2, wherein the auxiliary means for evaluating the estimation of the radial displacement $(R2-R1)_{AUX}$ comprise a means for determining the difference $(T2-T1)_{AUX}$ of the respective travel times of the acoustic signals S1 and S2 between said acoustic emitter (B1) and said acoustic receiver (B2) according to the following formula:

$$(R2-R1)_{AUX} \approx c(T2-T1)_{AUX}$$

where $(T2-T1)_{AUX}$ is the estimated travel time difference.

7. The acoustic positioning system according to claim 2, wherein the auxiliary means for evaluating the estimation of the radial displacement $(R2-R1)_{AUX}$ comprise an inertial means for measuring the estimation of the radial displacement $(R2-R1)_{AUX}$, said inertial means being based on the use of one or several accelerometers, or on the use of one or several inertial measurement units comprising gyroscopes and accelerometers, or on the use of one or several inertial navigation systems hybridized with other external positioning means.

8. The acoustic positioning system according to claim 1, wherein the acoustic emission means comprise at least two acoustic emitters (B1, B11) and the acoustic reception means comprise one acoustic receiver (B2) and wherein the system allows measuring the relative radial displacement between each of the couples formed by one acoustic emitter (B1, B11) and the acoustic receiver (B2), respectively.

9. The acoustic positioning system according to claim 8, wherein the auxiliary means for evaluating the estimation of the radial displacement $(R2-R1)_{AUX}$ comprise a means for determining the speed $V_{AUX}$ of the relative displacement between said acoustic emitter (B1) and said acoustic receiver (B2), based on the estimation of the Doppler offset of the acoustic waves transmitted between said acoustic emitter (B1) and said acoustic receiver (B2):

$$(R2-R1)_{AUX} = V_{AUX}T = \frac{C}{F}\text{DOPPLER} \times T.$$

10. The acoustic positioning system according to claim 8, wherein the auxiliary means for evaluating the estimation of the radial displacement $(R2-R1)_{AUX}$ comprises a means for determining the difference $(T2-T1)_{AUX}$ of the respective travel times of the acoustic signals S1 and S2 between said acoustic emitter (B1) and said acoustic receiver (B2) according to the following formula:

$$(R2-R1)_{AUX} \approx c(T2-T1)_{AUX}$$

where $(T2-T1)_{AUX}$ is the estimated travel time difference.

11. The acoustic positioning system according to claim 8, wherein the auxiliary means for evaluating the estimation of the radial displacement $(R2-R1)_{AUX}$ comprise an inertial means for measuring the estimation of the radial displacement $(R2-R1)_{AUX}$, said inertial means being based on the use of one or several accelerometers, or on the use of one or several inertial measurement units comprising gyroscopes and accelerometers, or on the use of one or several inertial navigation systems hybridized with other external positioning means.

12. The acoustic positioning system according to claim 1, wherein the acoustic emission means comprise one acoustic emitter (B1) and the acoustic reception means comprise at least two acoustic receivers (B2, B22) and wherein the system allows measuring the relative radial displacement between each of the couples formed by the acoustic emitter (B1) and one acoustic receiver (B2, B22), respectively.

13. The acoustic positioning system according to claim 12, wherein the auxiliary means for evaluating the estimation of the radial displacement $(R2-R1)_{AUX}$ comprise a means for determining the speed $V_{AUX}$ of the relative displacement between said acoustic emitter (B1) and said acoustic receiver (B2), based on the estimation of the Doppler offset of the acoustic waves transmitted between said acoustic emitter (B1) and said acoustic receiver (B2):

$$(R2-R1)_{AUX} = V_{AUX}T = \frac{C}{F}\text{DOPPLER} \times T.$$

14. The acoustic positioning system according to claim 12, wherein the auxiliary means for evaluating the estimation of the radial displacement $(R2-R1)_{AUX}$ comprise a means for determining the difference $(T2-T1)_{AUX}$ of the respective travel times of the acoustic signals S1 and S2 between said acoustic emitter (B1) and said acoustic receiver (B2) according to the following formula:

$$(R2-R1)_{AUX} \approx c(T2-T1)_{AUX}$$

where $(T2-T1)_{AUX}$ is the estimated travel time difference.

15. The acoustic positioning system according to claim 1, wherein the auxiliary means for evaluating the estimation of the radial displacement $(R2-R1)_{AUX}$ comprise a means for determining the speed $V_{AUX}$ of the relative displacement between said acoustic emitter (B1) and said acoustic receiver (B2), based on the estimation of the Doppler offset of the acoustic waves transmitted between said acoustic emitter (B1) and said acoustic receiver (B2):

$$(R2-R1)_{AUX} = V_{AUX}T = \frac{C}{F}\text{DOPPLER} \times T.$$

16. The acoustic positioning system according to claim 15, wherein the auxiliary means for evaluating the estimation of the radial displacement $(R2-R1)_{AUX}$ comprise a means for determining the difference $(T2-T1)_{AUX}$ of the respective travel times of the acoustic signals S1 and S2 between said acoustic emitter (B1) and said acoustic receiver (B2) according to the following formula:

$$(R2-R1)_{AUX} \approx c(T2-T1)_{AUX}$$

where $(T2-T1)_{AUX}$ is the estimated travel time difference.

17. The acoustic positioning system according to claim 1, wherein the auxiliary means for evaluating the estimation of the radial displacement $(R2-R1)_{AUX}$ comprise a means for determining the difference $(T2-T1)_{AUX}$ of the respective travel times of the acoustic signals S1 and S2 between said acoustic emitter (B1) and said acoustic receiver (B2) according to the following formula:

$$(R2-R1)_{AUX} \approx c(T2-T1)_{AUX}$$

where $(T2-T1)_{AUX}$ is the estimated travel time difference.

18. The acoustic positioning system according to claim 1, wherein the auxiliary means for evaluating the estimation of the radial displacement $(R2-R1)_{AUX}$ comprise an inertial means for measuring the estimation of the radial displacement $(R2-R1)_{AUX}$, said inertial means being based on the use of one or several accelerometers, or on the use of one or several inertial measurement units comprising gyroscopes and accelerometers, or on the use of one or several inertial navigation systems hybridized with other external positioning means.

19. The acoustic positioning system according to claim 1, wherein the product of the time interval T by the radial speed V of relative displacement between the acoustic emitter and the acoustic receiver being such that:

$$-\frac{\lambda}{2} < VT < \frac{\lambda}{2},$$

it may be said that the estimation of the radial displacement $(R2-R1)_{AUX}$ is equal to zero.

20. An acoustic method for relative positioning between acoustic emission means (B1, B11) and acoustic reception means (B2), said acoustic emission means comprising an acoustic emitter (B1) and an emitter clock and said acoustic reception means comprising an acoustic receiver (B2) and a receiver clock, the emitter clock and the receiver clock being asynchronous, said method comprising the following steps:
  emitting, by said acoustic emitter (B1, B11), a sequence of at least one first acoustic signal S1 and one second acoustic signal S2, of same central acoustic frequency f, separated by a time interval T determined by said emitter clock, receiving and measuring the phase of arrival $\phi_1$ of the first acoustic signal S1 and the phase of arrival $\phi_2$ of the second acoustic signal S2 on said acoustic reception means comprising an acoustic receiver (B2) and a receiver clock, said phases of arrival $\phi_1$, $\phi_2$ being measured with respect to a reference oscillator, evaluating, with an accuracy of one half-wavelength, an estimation of the radial displacement $(R2-R1)_{AUX}$ between, on the one hand, the distance R1 traveled by the first acoustic signal S1 between the acoustic emitter and the acoustic receiver, and on the other hand, the distance R2 traveled by the second acoustic signal S2 between the acoustic emitter and the acoustic receiver, and calculating the relative displacement (R2-R1) between said acoustic emission means and said acoustic reception means as a function of the estimation of the radial displacement $(R2-R1)_{AUX}$, of the time interval T and of the phases of arrival $\phi_1$, $\phi_2$, respectively, of the first acoustic signal S1 and of the second acoustic signal S2.

* * * * *